April 29, 1930.  H. WOODHEAD  1,756,417
PIPE COUPLING
Original Filed Jan. 7, 1926
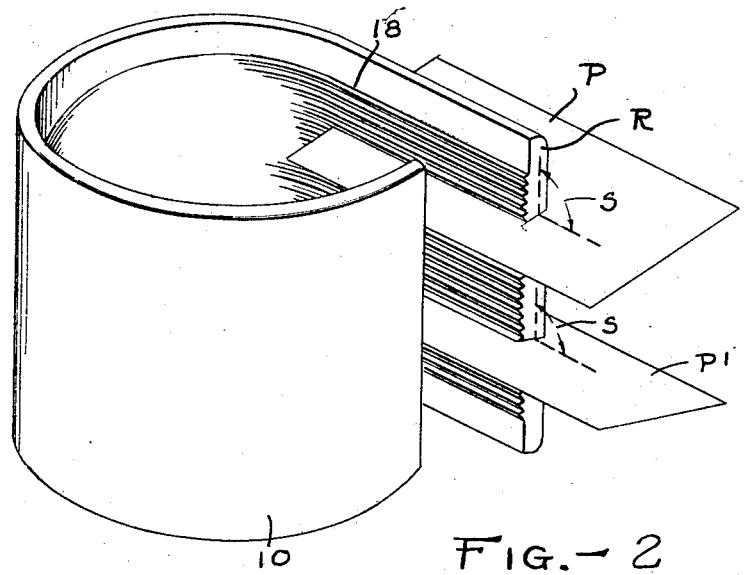
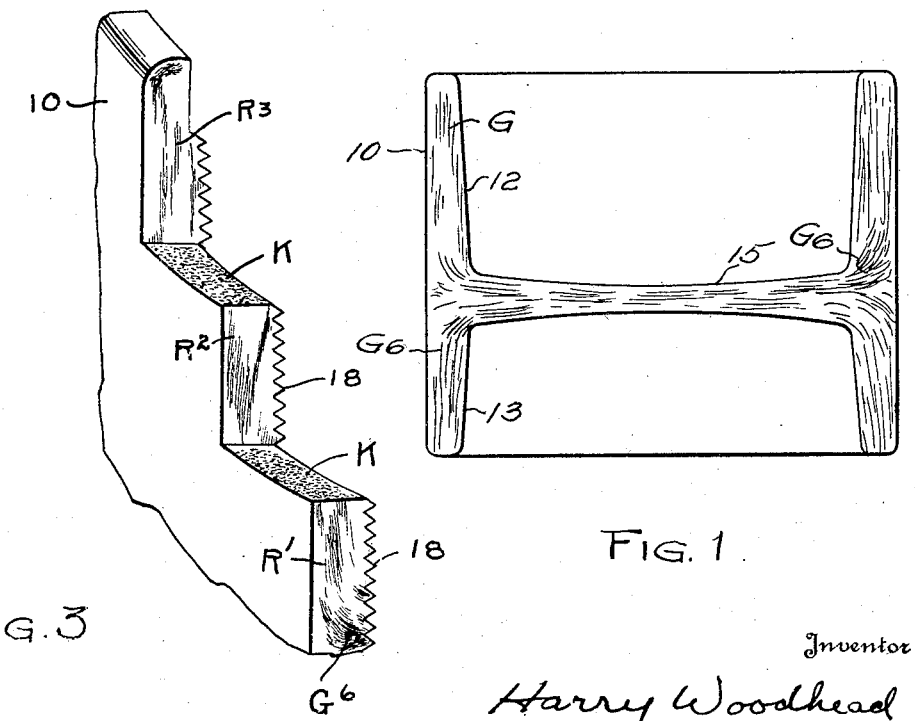
Inventor
Harry Woodhead
By Bates, Macklin,
Folrick & Teare  Attorney Patented Apr. 29, 1930

1,756,417

UNITED STATES PATENT OFFICE

HARRY WOODHEAD, OF CLEVELAND, OHIO, ASSIGNOR TO THE MIDLAND STEEL PRODUCTS COMPANY, OF CLEVELAND, OHIO, A CORPORATION OF OHIO

PIPE COUPLING

Application filed January 7, 1926, Serial No. 79,785. Renewed March 10, 1930.

This invention relates to pipe couplings for connecting the threaded ends of pipes, and is particularly concerned with large pipe couplings, such for example as for use on oil well casing and drill tubing.

In the manufacture and use of such couplings, the following objects are desirable of obtainment. Greatest possible strength in a seamless coupling having a metal of characteristics adapted to give great strength, and capable of easy and smooth threading operation. The material should be different from the tubing or pipe onto which it is to be threaded in order to avoid the sticking, cold welding or galling of the coupling onto the pipe thread. The cheapness of manufacture is also of great importance.

I have found that a forged seamless coupling may be made by various forging methods, such for example as shown, described and claimed in my pending application for a process for making pipe couplings, Serial No. 752,610 filed November 28th, 1924. Such a coupling accomplishes all of the above objects and embodies the best present known characteristics for seamless steel pipe couplings, as well as having certain characteristics not believed to be found in any pipe couplings known prior to my invention.

The pipe coupling described in this application, is a seamless coupling. It is of forged metal having a composition chosen for the most desirable characteristics of easy threading, as well as great strength, and strength particularly in the threads, and the characteristics by which it is distinguished from the present known couplings will hereinafter appear in connection with the following description which refers to the accompanying drawings. The essential characteristics of my coupling are hereinafter summarized in the claims.

In the drawings Fig. 1 is a diagrammatic transverse radial section, that is, a section on a radial plane taken through a forging from which my coupling is made; Fig. 2 is a perspective view intended to illustrate the relation of the surfaces of the threads to any radial plane and for this purpose the coupling is here assumed to have been cut and a portion straightened as shown; Fig. 3 is an enlarged sectional perspective showing a series of surfaces on radial axial planes, and other surfaces on planes transverse to the axis of the coupling and illustrating by the lines on the surfaces the direction of the grain of the metal.

It is well recognized that steel which has been worked, such as by rolling, forging or the like, has certain characteristics of its nodules which may be referred to as the grain of the metal. It is analogous to the grain of wood. In a billet of steel, prior to working it, the nodules are of irregular shapes and sizes, but are more nearly spherical. After rolling such billet, it will be found that they take more and more the form of needles, or at least may be said to be very elongated and substantially parallel with each other.

By a method well known to metallurgists, a prepared surface of such piece of steel may be etched and the grain appears very prominently on the surface and may be seen with the naked eye. It is found also that the metal may be split or torn apart much more readily in the direction parallel to the grain, that is, it severs along the line of the grain very much as wood does, although of course without any such great difference of strength. There is, however, a considerable difference of strength, and it has been found that where the threads of a pipe coupling are parallel with the grain, a large proportion of such couplings have to be rejected because of imperfect threading, the threads tearing off or splitting along the grain. Such threads also have a tendency to cold weld or gall upon the pipe affording very much more difficulty in the use of such couplings, as well as resulting in a weaker coupling.

Previous methods of making pipe couplings afford many difficulties which it is desired to avoid. Such methods include welding rectangular blanks along a longitudinal seam to form the cylindrical coupling blank. The grain of the metal in such an instance is usually parallel to the threads, but regardless of the direction of the grain, the seam of the weld may have hidden defects, and it is difficult to weld a metal having the desired threading characteristics, namely for example, a high sulphur content.

Couplings now made in large numbers from seamless steel tubing cut into the desired lengths present a spiral grain due to the spiral rolling action in the forming of the tubing, and the metal is extended and stretched instead of being compressed and strengthened.

Other methods include cup drawing from flat blanks, which present various difficulties, such as eccentricity of the finished product, and the direction of the grain being in part at least parallel with the threads, as well as resulting in a large waste in cutting off one end of the cup, and waste caused by losses due to defects in the steel thus drawn. The strength of any couplings made by such prior methods has been found to be inferior in strength and threading qualities, and one of the essential objects of this invention is to so forge the blank without machining operations as to provide the aligned tapered surfaces inside of the blank ready for threading.

My coupling blank may be formed with the aligned tapers by a forging process, reducing the machining operations necessary. It is well known, that in the use of materials for the coupling similar to the material of the pipe, the difficulties with thread galling are greatly increased. At present it is customary to use electro-plating to coat the threads of couplings to avoid this galling, in addition to which the joints are thoroughly lubricated before the coupling is threaded out of the pipe. These expedients, however, do not eliminate the difficulty of the first thread cutting operation upon the materials which are governed by the process of manufacture such as welding, rolling, or cupping, rather than by the desirable characteristics for thread cutting.

As stated, I have found that forging process causes a rearrangement of the grain of the metal which results in the threads being uniformly transverse to the grain. If a coupling blank, for example, is made by the process of my application above referred to, it is pressed from a substantially square block between two male aligned tapered dies, causing the metal to flow outwardly and then transversely along a confining cylindrical die concentric with the male dies. The result of this forging step is that shown in Fig. 1 as having a substantially cylindrical wall 10 with aligned tapered surfaces 12 and 13. The intermediate web 15 may be removed by a single punching operation. This web is shown as disposed below the medial plane of the cylinder which is to compensate for the case with which the metal flows upwardly along the advancing male die as compared with the flow downwardly along the stationary male die. The displacement shown, however, does not alter the relative length of the taper sufficiently to require a machining operation preparatory to threading.

The metal flowing outwardly and then being turned and caused to flow longitudinally in both directions causes in the blank shown in Fig. 1 an arrangement of the grain such that it may be said the elongated nodules or needles lie outwardly radially in the web and substantially parallel with the axis in the wall 10. At the juncture between the web and wall, the needles are turned each way from the outward flow but still are uniform in this characteristic, namely: They are almost entirely uniformly parallel with any radial plane through the axis of the blank. That is referring to Fig. 1, if the plane of the sheet be considered as any such radial axial plane and the "needles" of the web as well as those in the wall, appear to be lying in true parallelism in that plane. A simile may be helpful in making this clear. If these nodules were considered as loose elongated iron filings and were arranged on a sheet in accordance with the lines 6—6, they would be for the most part flat upon that sheet and they would represent the arrangement of the grain of the steel. This is shown to be true by an etched sample of this coupling blank which appears as illustrated in that figure.

Assuming that the web 15 has been removed and the tapered threads cut inwardly from the opposite ends of the blank, it may be accurately stated that all of these threads are substantially at right angles to the grain of the metal. Assuming the coupling were cut by a radial axial plane, if the surfaces of the threads were also represented by planes, the planes of the surfaces of the threads would be normal to the radial axial plane. This is illustrated in Fig. 2 where the threads 18 are shown, as stated, so that their surfaces would be substantial planes, one of which is illustrated by the parallelogram P. The angle between P and R corresponding to the radial axial plane, may be indicated at S, and it will be noted that this is a right angle. The line of the top or bottom of the thread will also lie approximately in a plane such as $P^1$ which is normal to, that is at right angles to, the radial axial plane R, again forming a right angle as at S. Such a plane is indicated at parallelogram $P^1$.

Referring to Fig. 3 which as stated, is an enlarged view showing an etched cut away portion of my coupling. It will be noted that the lower portion of the view is the arrangement opposite the web of the blank. At this point the grains are shown as pointing outwardly and then upwardly but still parallel with the radial surface. A transverse surface as at K presents the effect of looking at the end of the bundle of needles, clearly showing that it is the end of the elongated nodules or needles of the grain here appearing. The other radial surfaces, as at $R^2$ and $R^3$, contrast with the surfaces K, K and it will be seen that at all points the threads are cut across the body of the nodules, or normal to the plane in which these nodules lie.

From the foregoing description it will be understood that my pipe coupling when threaded has all of its threads cut transversely to the grain of the metal and otherwise fulfills the desirable characteristics and objects hereinbefore set forth. It is a seamless coupling of forged metal having the desired composition for strength and threading qualities, which differs from the metal of tubing on which it is to be threaded and its threads are stronger than the threads of couplings made by present methods. Of course, the grain of the metal at the threads presents the ends of the elongated nodules to the surface of the threads of the tubing. The likelihood for galling is greatly reduced and actual practice has demonstrated that in the manufacture of such couplings, the threading is much more easily accomplished and the cold welding or galling is almost entirely eliminated.

It will also be seen from the foregoing that the metal of this coupling is more compact or denser than the metal of the other types of prior couplings described. It has been proven that it is correspondingly very materially stronger.

Having thus described my invention, I claim:

1. A pipe coupling of the character described, consisting of a seamless forged cylindrical member of steel or the like, having its structure nodules elongated and so positioned as to form a grain, and threaded nearly full length substantially uniformly transversely to said grain throughout.

2. A seamless pipe coupling of forged steel of predetermined characteristics selected for strength and threading qualities said coupling being threaded and having its grain transverse to the lines and planes of the threads throughout the length of the thread whereby the resulting coupling as compared to those in standard and extensive use has a substantially greater density and correspondingly greater strength in use, and is capable of being threaded.

3. A seamless forged pipe coupling having tapered threads extending inwardly from opposite ends thereof, and having a density greater than steel tubing or rolled couplings and, its grain consisting of elongated nodules substantially parallel with any radial axial plane, and therefore substantially at right angles with the surface of the individual threads.

4. A seamless threaded pipe coupling of forged steel more highly compressed as compared to rolled or drawn steel, having the grain of the metal substantially parallel to any radial axial plane and having threads cut at all points directly transversely to the grain of the metal.

5. A seamless threaded pipe coupling of steel composition selected for greatest strength, and being more highly compressed throughout, as compared to rolled or drawn steel, and having the grain of the metal at substantially right angles to the direction of the individual threads.

In testimony whereof, I hereunto affix my signature.

HARRY WOODHEAD.